Figure 1:
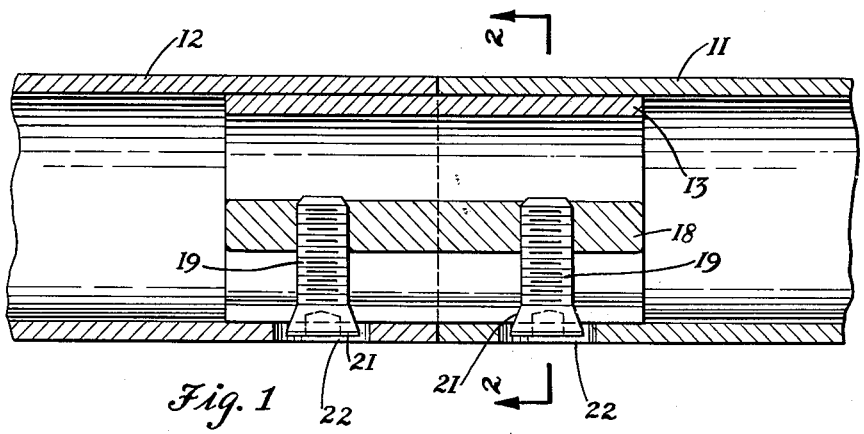

Aug. 22, 1961

C. H. SCOTT 2,997,317

COUPLING DEVICE FOR TUBULAR MEMBERS
HAVING INTERNAL WEDGE MEANS

Filed Nov. 1, 1957

INVENTOR.
CHARLES H. SCOTT
BY Richard Church
Attorney

United States Patent Office 2,997,317
Patented Aug. 22, 1961

2,997,317
COUPLING DEVICE FOR TUBULAR MEMBERS HAVING INTERNAL WEDGE MEANS
Charles H. Scott, South Norwalk, Conn., assignor to Dorr-Oliver Incorporated, Stamford, Conn., a corporation of Delaware
Filed Nov. 1, 1957, Ser. No. 693,922
8 Claims. (Cl. 285—397)

This invention relates to improved methods and means for coaxially joining elongated structural members. More particularly, this invention is concerned with improved means for coaxially joining abutting structural members having hollow open ends on which may be tubular members in a manner that permits ease in the assembly and disassembly of such members and avoids the use of fittings external to the periphery of such abutting members.

Many items of manufacture require the use of elongated structural members which, for ease of construction, are preferably manufactured in several parts or sections. Such items of manufacture include, inter alia, protective handrails, tent poles and stakes, playground equipment, clothesline poles, post and cross members for awnings, and other similar devices. The fabrication of such members in sections that are conveniently assembled makes the manufacture and installation easier, greatly simplifies subsequent plating or galvanizing, and provides greater convenience in handling and storage.

It is thus an object of this invention to provide simplified means for coaxially joining elongated structural members.

It is a further object of this invention to provide means for coaxially joining elongated structural members without welding or threading such members or using fittings external to the periphery of such members.

It is a still further object of this invention to provide simple means for coaxially joining several elongated structural members in a manner that permits ease in assembly or disassembly.

Briefly, the objects of this invention are attained by positioning an expansible member within abutting ends of the elongated structural members to be joined. By the application of forces created by screw means, the expansible member is spread causing it to seat firmly against the interior walls of such structural members whereby they are secured in fixed axial relationship to each other. Additionally, holes are provided in the abutting ends of the structural members to provide access to the locking device. While the locking means are generally described herein for use in joining tubular members, it is understood that they are equally applicable for joining solid bars and rods providing only that such solid members are drilled at abutting ends or have hollow open ends to accommodate the locking means.

In view of the foregoing objects, the invention features an arrangement wherein a tubular sleeve member split along one line is fitted into the hollow open ends of the two structural members. A rigid locking means or a locking member is located within the sleeve member. The locking member has edge portions opposite each other for engaging respective sleeve portions located on opposite sides of a radial plane coinciding with the longitudinal axis of the sleeve member and with the longitudinal split. At least a pair of screws are provided to engage respective threads in the locking means transversely of the sleeve member and registering with respective lateral openings in the hollow ends of the structural members, and accessible through these openings. Furthermore, each of these screws has a frusto-conical head spaced from the contact edge portions of the locking means and directly engaging the edges of the longitudinal split and jointly with the contact portions of the associated locking means effective to expand the sleeve member into firm and secure peripheral engagement with the hollow ends when the screws shall have been tightened each relative to a respective hollow end.

In order that this invention may be clearly understood and readily carried into effect, it will now be described, by way of example, with reference to the accompanying drawings.

Figure 2:
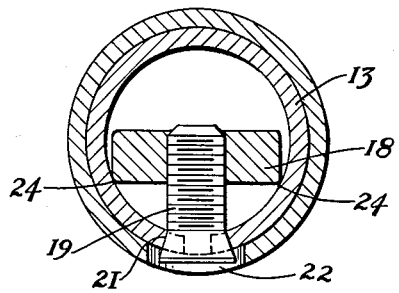
Figure 3:
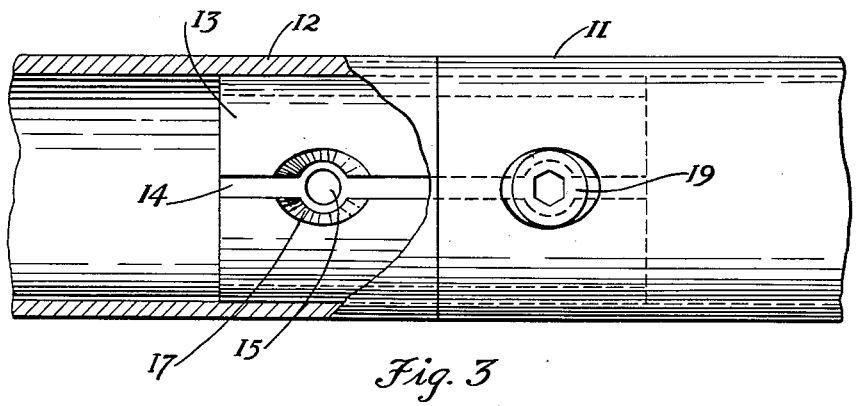

In the drawings:
FIGURE 1 is a sectional view of an embodiment of the invention with certain elements shown in elevation for purposes of clarity.
FIGURE 2 is a sectional view taken on the line 2—2 of FIGURE 1 with certain elements shown in elevation for purposes of clarity.
FIGURE 3 is a bottom view of FIGURE 1 with certain elements shown in section for purposes of clarity.

*Description*

Means for joining a pair of structural members having hollow open ends, for example tubular members 11 and 12 in accordance with this invention are shown in FIGURE 1. As can best be seen in FIGURE 2, the locking means comprise an elongated tubular split sleeve member 13, a locking bar 18, and screw means 19. Holes 22 are drilled in tubular members 11 and 12 to provide access to screws 19. The locking bar 18 is a rigid member, preferably rectangular in cross section, that fits within the interior of split sleeve 13. The locking bar 18 is drilled and threaded to receive screws 19. Screws 19 have conical heads 21 that engage split sleeve 13 along split 14 at holes 15.

In practice, to joint tubular members 11 and 12, split sleeve 13 and locking bar 18 are slid into abutting ends of tubular members 11 and 12 and aligned to enable screws 19 to be inserted through access holes 22 of members 11 and 12, through holes 15 of split sleeve 13, and threaded into locking bar 18. Screws 19 are then advanced drawing locking bar 18 into contact with the interior of split sleeve 13 at points 24 and drawing screw heads 21 into the sides of holes 15 as at 17. Due to the conical shape of heads 21, further advancement of screws 19 into locking bar 18 causes split sleeve 13 to be spread apart as at 14. This procedure is continued until split sleeve 13 is expanded and firmly seated against the interior walls of tubular members 11 and 12. By so seating split sleeve 13 against the inner walls of tubular members 11 and 12, a firm joinder of such tubular members is achieved without the necessity of fittings extending beyond the periphery of abutting tubular members. Also, it can readily be seen that this joinder can easily be broken by backing off on screws 19 and allowing split sleeve 13 to collapse as at 14 away from the inner walls of tubular members 11 and 12.

In FIGURE 3, holes 15 of split sleeve 13 are illustrated as being counter-sunk as at 17. While this counter-sinking of holes 15 is not necessary in the practice of this invention, it is a desirable refinement as it enables more efficient engagement of screw heads 21 with the sides of holes 15.

Other modifications of this invention will be readily apparent to those skilled in the art. For example, screws 19 may have frustro-conical heads with their apexes pointed away from, rather than toward, the center of split sleeve 13. In this modification, each of the screws are positioned entirely within split sleeve 13 in order that the conical heads may make contact with the interior edges of split 14. By backing off on such screws, locking bar 18 is seated on the upper interior side of split sleeve 13 opposite to the side where the heads of the screws make contact.

As this invention may be embodied in several forms without departing from the spirit of essential characteristics thereof, the present embodiment is, therefore, illustrative and not restrictive, since the scope of the invention is defined by the appended claims rather than by the description preceding them, and all changes that fall within the metes and bounds of the claims, or equivalents of such metes and bounds, are, therefore, intended to be embraced by the claims. For example, while the invention has been particularly described in relation to tubular members, it is understood that these locking means can be used with solid structural members providing that the abutting ends of such members are drilled or have hollow open ends to receive the locking means.

I claim:

1. In a connection for a pair of structural members having hollow open ends each provided with a lateral opening spaced from the end of the respective structural member; coupling means which comprise a tubular sleeve member longitudinally split along one line and of slightly smaller outside diameter than the inside diameter of said open ends and having end portions adapted for insertion in the respective open ends; rigid locking means located within said sleeve member, and having at least a pair of screw receiving threads as well as having contact edge portions opposite each other for engaging respective sleeve portions located opposite each other from said longitudinal split; at least a pair of screws engaging respective threads in said locking means transversely of said sleeve member and registering with respective lateral openings in said hollow ends to be accessible therethrough, each screw having a frusto-conical head spaced from said contact edge portions of the locking means and directly wedgingly engaging the edges of said longitudinal split and jointly with said contact portions of the associated locking means effective to expand said sleeve member into firm and secure peripheral engagement with said hollow ends when said screws have been tightened each relative to a respective hollow end.

2. The coupling means according to claim 1, wherein each said frusto-conical head is arranged with its wide end facing in outward radial direction relative to the axis of the sleeve member, and wherein said sleeve member is drilled and counter sunk at respective points spaced along said longitudinal split for receiving respective frusto-conical heads in respective counter sinks.

3. The coupling means according to claim 1, wherein said locking means are in the form of bar means providing contact edge portions substantially parallel to the longitudinal axis of said sleeve member.

4. The coupling means according to claim 1, wherein said locking means are in the form of a single rigid bar providing contact edge portions substantially parallel to the longitudinal axis of said sleeve member, and wherein said sleeve member is drilled and counter-sunk at respective points spaced along said longitudinal split for receiving respective frusto-conical heads in respective countersinks, each countersink being so shaped of a larger diameter that the associated frusto-conical head of a smaller diameter has substantially tangential wedge pressure contact with said countersink at points located opposite each other from said split.

5. A structural connection comprising a pair of tubular members having open ends each provided with a lateral opening spaced from the end of the respective tubular member; a tubular sleeve member longitudinally split along one line of slightly smaller outside diameter than the inside diameter of said open ends, and having end portions inserted in respective hollow ends; rigid locking means located within said sleeve member and having at least a pair of screw receiving threads as well as having contact edge portions opposite each other for engaging respective sleeve portions located opposite each other from said longitudinal split; at least a pair of screws engaging respective threads in said locking means transversely of said sleeve member and registering with respective lateral openings to be accessible therethrough, each screw having a frusto-conical head with the wide end thereof facing in an outward radial direction relative to the longitudinal axis of the sleeve member, said frusto-conical heads spaced from said contact edge portions and directly wedgingly engaging the edges of said longitudinal split and jointly with said contact edge portions of the associated locking means effective to expand said sleeve member into firm and secure peripheral engagement with said hollow ends when said screws shall have been tightened each relative to a respective hollow end.

6. The coupling means according to claim 5, wherein said split sleeve member is drilled and counter sunk at respective points spaced along said longitudinal split for receiving respective frusto-conical heads in respective counter sinks.

7. The coupling means according to claim 5, wherein said locking means are in the form of bar means providing contact edge portions substantially parallel to the longitudinal axis of the sleeve member.

8. The coupling means according to claim 5, wherein said locking means are in the form of a single rigid bar and wherein said sleeve member is drilled and counter-sunk at respective points spaced along said longitudinal split for receiving respective frusto-conical heads in respective countersinks each countersink being so shaped of a larger diameter that the associated frusto-conical head of a smaller diameter has substantially tangential wedge pressure contact with said countersink at points located opposite each other from said split.

References Cited in the file of this patent

UNITED STATES PATENTS

| | | |
|---|---|---|
| 1,005,153 | Case | Oct. 10, 1911 |
| 1,068,030 | Whitmore | July 22, 1913 |
| 1,371,828 | Walbert | Mar. 15, 1921 |
| 1,435,414 | Morton | Nov. 14, 1922 |
| 1,678,350 | Ott | July 24, 1928 |
| 2,290,430 | Heiser | July 21, 1942 |
| 2,645,509 | Valenta | July 14, 1953 |
| 2,850,304 | Wagner | Sept. 2, 1958 |

FOREIGN PATENTS

| | | |
|---|---|---|
| 609,658 | Great Britain | Oct. 5, 1948 |
| 744,284 | Great Britain | Feb. 1, 1956 |